(12) United States Patent
Hullverson et al.

(10) Patent No.: US 11,538,087 B2
(45) Date of Patent: Dec. 27, 2022

(54) PET FOOD RECOMMENDATION DEVICES AND METHODS

(71) Applicant: Societe des Produits Nestle S.A., Vevey (CH)

(72) Inventors: Everett Hullverson, Kirkwood, MO (US); Brian Michael Zanghi, Ballwin, MO (US); Alison Beloshapka, St. Louis, MO (US); Robert Leslie Hunt, St. Louis, MO (US); Nathan Tippy, St. Louis, MO (US)

(73) Assignee: SOCIETE DES PRODUITS NESTLE SA, Vevey (CH)

( * ) Notice: Subject to any disclaimer, the term of this patent is extended or adjusted under 35 U.S.C. 154(b) by 339 days.

(21) Appl. No.: 16/775,825

(22) Filed: Jan. 29, 2020

(65) Prior Publication Data
US 2020/0250733 A1 Aug. 6, 2020

Related U.S. Application Data (60) Provisional application No. 62/800,199, filed on Feb. 1, 2019.

(51) Int. Cl.
*G06Q 30/00* (2012.01)
*G06Q 30/06* (2012.01)
(Continued)

(52) U.S. Cl.
CPC ......... *G06Q 30/0631* (2013.01); *A23K 50/00* (2016.05); *G06N 3/08* (2013.01);
(Continued)

(58) Field of Classification Search
None
See application file for complete search history.

(56) References Cited

U.S. PATENT DOCUMENTS

| | | | |
|---|---|---|---|
| 6,156,355 A | 12/2000 | Shields | |
| 6,358,546 B1 * | 3/2002 | Bebiak | A23K 50/40 426/805 |

(Continued)

FOREIGN PATENT DOCUMENTS

| | | | | |
|---|---|---|---|---|
| CN | 106447117 A | * | 2/2017 | ........... A01K 29/005 |
| CN | 107820616 A | * | 3/2018 | ............. A01K 11/00 |

(Continued)

OTHER PUBLICATIONS

Zheng Qin, "Introduction to E-commerce", 2009, Springer, springer.com (Year: 2009).*

(Continued)

*Primary Examiner* — Michelle T Kringen
*Assistant Examiner* — Norman Donald Sutch, Jr.

(57) ABSTRACT

A system or method is provided that includes receiving a pet image. The pet image may depict a pet and may be received from a user device. The system or method may further analyze the pet image with a pet image recognition model to determine one or more pet characteristics of the pet. In certain embodiments, analyzing the pet image may further include identifying one or more image characteristics of the pet image. The system or method may further analyze the pet characteristics with a pet food recommendation model to generate a pet food recommendation for the pet.

20 Claims, 3 Drawing Sheets

(51) Int. Cl.
  *A23K 50/00* (2016.01)
  *G06N 3/08* (2006.01)
  *G06V 40/10* (2022.01)

(52) U.S. Cl.
  CPC ..... *G06Q 30/0623* (2013.01); *G06Q 30/0641* (2013.01); *G06V 40/10* (2022.01)

(56) References Cited

U.S. PATENT DOCUMENTS

| | | | |
|---|---|---|---|
| 8,091,509 B2 | 1/2012 | Perez-Camargo et al. | |
| 9,053,395 B2 | 6/2015 | Tanaka | |
| 9,443,166 B2 | 9/2016 | Kinard | |
| 9,792,530 B1 | 10/2017 | Wu | |
| 9,922,243 B2 | 3/2018 | Mcvey | |
| 10,268,880 B2* | 4/2019 | Wee | A61B 5/702 |
| 2005/0240434 A1* | 10/2005 | Wooten | G16H 40/67 |
| | | | 705/2 |
| 2006/0045909 A1 | 3/2006 | Friesen | |
| 2009/0182620 A1* | 7/2009 | Sunvold | G06Q 30/0201 |
| | | | 705/7.29 |
| 2013/0069978 A1* | 3/2013 | Tanaka | G06V 40/10 |
| | | | 382/110 |
| 2013/0083999 A1 | 4/2013 | Bhardwaj et al. | |
| 2014/0141134 A1 | 5/2014 | Johnson et al. | |
| 2014/0272028 A1* | 9/2014 | Donavon | G16H 10/60 |
| | | | 707/769 |
| 2015/0131868 A1 | 5/2015 | Rooyakkers | |
| 2015/0220569 A1 | 8/2015 | Folkens | |
| 2016/0007097 A1 | 1/2016 | Daesik | |
| 2016/0253742 A1* | 9/2016 | Bosher | G06Q 10/08 |
| | | | 705/26.82 |
| 2016/0321300 A1 | 11/2016 | Kamath | |
| 2017/0042194 A1 | 2/2017 | Bouthegourd et al. | |
| 2017/0220907 A1 | 8/2017 | Liu | |
| 2018/0070558 A1 | 3/2018 | Skvorc | |
| 2018/0182016 A1 | 6/2018 | Giampaolo et al. | |
| 2019/0166801 A1* | 6/2019 | Klein | G06T 7/62 |
| 2019/0205973 A1* | 7/2019 | Gutnik | G06Q 30/0641 |
| 2020/0058405 A1* | 2/2020 | Butterwick | A61B 5/7275 |
| 2021/0065277 A1* | 3/2021 | Bramson | G06Q 30/0631 |

FOREIGN PATENT DOCUMENTS

| | | |
|---|---|---|
| CN | 109548691 | 4/2019 |
| EP | 1820407 A1 | 8/2007 |
| IN | 201821034271 | 12/2018 |
| WO | 2018094892 | 5/2018 |

OTHER PUBLICATIONS

Guotian Xie; "Improve Dog Recognition By Mining More Information From Both Click-Through Logs and Pre-Trained Models"; Jul. 11, 2016; 2016 IEEE International Conference on Multimedia & Expo Workshops (ICMEW) (Year: 2016).*

International Search Report and Written Opinion to application No. PCT/IB2020/050706 dated Apr. 24, 2020.

Blippar, What Breed is My Dog? https://www.blippar.com/blog/2016/07/27/what-breed-my-dog Jul. 27, 2016.

Petnet, CES 2018: Petnet's New SmartShop Beta Curates a Selection of Pet Foods Tailored to a Pet's Breed, Age and More, https://www.businesswire.com/news/home/20180108005527/en/CES-2018-Petnet's-New-SmartShop-Beta-Curates Jan. 8, 2018.

Microsoft, What-Dog.net, https://www.what-dog.net 2016.

Segarra, Google Lens Can Now Identify Dog and Cat Breeds, http://fortune.com/2018/04/13/google-lens-app-dog-cat-breeds/ Apr. 13, 2018.

Garun, Amazon's image recognition AI can identify your dog down to its breed, https://www.theverge.com/2016/11/30/13799582/amazon-rekognition-machine-learning-image-processing Nov. 30, 2016.

* cited by examiner

PET FOOD RECOMMENDATION DEVICES AND METHODS

CROSS REFERENCE TO RELATED APPLICATIONS

This application claims priority to U.S. Provisional Application Ser. No. 62/800,199 filed Feb. 1, 2019, the disclosure of which is incorporated in its entirety herein by this reference.

FIELD

The present disclosure relates generally to methods and devices for pet foods. More specifically, the present disclosure relates to methods and devices for providing a pet food recommendation and/or a pet feeding recommendation.

BACKGROUND

Many pet owners care deeply for their pets and understand that decisions related to what and how much food to feed their pets can contribute to longer, happier, and healthier lives together. However, the characteristics of each pet and the circumstances and preferences of the pet and owner are unique. Moreover, those characteristics, circumstances, and preferences change over time. For this reason, consumers seek choices in what to feed their pets and information to help guide their decisions. However, the plethora of products and information sources can complicate this process and leave consumers with unresolved emotions and questions. Lack of information or a change in conditions can also mean that a feeding decision optimal at one point in a pet's life may be less than optimal at another.

Existing solutions are primarily provided by retailers or manufacturers. Retailer solutions rely on user defined inputs and are largely filter based, static, reactive, and impersonal. Filters may narrow a selection based on characteristics of the products available, but they do not capture information sufficient to provide the optimal solution for the individual pet. Moreover, existing solutions do not provide proactive recommendations that account for changes in the pet over time. Manufacturer product selectors feature many of the same characteristics and drawbacks. Even in instances where a manufacturer may capture more information about the individual pet, recommendations may still only include product recommendations and may lack actionable recommendations for owners. Further, these recommendations may only be suitable for a given point in time (i.e., the recommendations are not proactive and/or do not change over time). Also, the recommendations are generally limited by the breadth of the portfolio of a single pet food manufacturer.

SUMMARY

The present disclosure provides advantages and solutions to problems in existing technologies for making pet food recommendations. In this regard, a pet food recommendation system may capture the most relevant information about a pet owner and a pet to streamline the decision process and provide personalized pet food recommendations and/or pet feeding recommendations. Personalized pet food recommendations and/or pet feeding recommendations may be provided initially and/or proactively throughout the pet's life. For example, a pet food and/or pet feeding recommendation can help a pet owner transition from a current diet and feeding recommendation to one that may help to maintain or change body condition, with the ultimate goal of achieving ideal body condition for that individual pet.

In an embodiment, personalized pet food recommendations and/or pet feeding recommendations may consider a body condition of the pet, a variance to an expected weight of the pet, an activity level of the pet, a morphology of the pet, a breed, and/or a breed size of the pet. For example, a pet's breed can provide information about certain characteristics and general parameters one can expect to see within those characteristics, such as weight range and activity level, but each individual pet will have a unique weight and/or activity. The personalized pet food recommendations and/or pet feeding recommendations may further consider pet owner preferences, pet needs and/or pet preferences (e.g., the presence and/or absence of certain ingredients, for example grains or protein type, in the pet food, the degree to which the product is made from natural ingredients, the incompatibility of a food with a pet due to a potential for allergic response or sensitivity, and the retail channel of the pet food product) to personalize the recommendation for the pet and the pet owner. Additionally, the pet food recommendations and/or pet feeding recommendations may further consider body conformation characteristics and/or morphometric measurements as described in U.S. Pat. No. 8,091,509 and U.S. Patent Application Publication No. 2017/0042194, each of which is incorporated herein by reference.

In an embodiment, the pet may be a dog, a cat, a bird, a rodent, a horse, a pig, a fish, a reptile and/or any other household pet and/or domesticated animal.

Accordingly, one aspect of the disclosure is directed to a method comprising: receiving a pet image depicting a pet; analyzing, with a pet image recognition model, the pet image to determine one or more pet characteristics of the pet; receiving one or more pet-related data inputs; analyzing, with a pet food recommendation model, the pet characteristics and pet-related data inputs to generate a pet food recommendation and/or pet feeding recommendation for the pet. In some embodiments, the pet characteristics comprise one or more of a breed, a breed size, a pet size, a body condition, a life stage, an activity level, a pet gender, a pet gender status, and a weight of the pet. In some embodiments, the pet-related data inputs may comprise one or more of a pet preference, a user preference, and/or pet characteristics. In one embodiment, the pet and/or user preference comprises one or more of a grain preference, a protein preference, a food texture, a natural ingredient preference, and a shopping preference. In another embodiment, the pet and/or user preference is selected from the group consisting of a grain preference, a protein preference, a food texture, a natural ingredient preference, and a shopping preference. In some embodiments, the pet-related data inputs comprise a pet characteristic. In one embodiment, one or more pet characteristics are determined by the pet image recognition model and one or more additional pet characteristics are input by the user.

In some embodiments, the pet image is received from a user device. In one embodiment, the user device is a mobile device, for example, a mobile phone. In another embodiment, the user device is a laptop or a desktop computer.

In some embodiments, the analyzing the pet image further comprises: analyzing the pet image to identify one or more image characteristics of the pet image; and determining the one or more pet characteristics based on the image characteristics. In some embodiments the image characteristics are selected from the group consisting of an outline of the pet, an area enclosed by the outline of the pet, the percentage of pixels of the pet image occupied by the pet, one or more geometric dimensions of the pet within the pet image. In some embodiments, the geometric dimensions are selected from length, height, distance from foot to shoulder, distance from back to stomach, chest breadth, chest depth.

In some embodiments, the method further comprises: filtering a list of pet food products based on at least one user preference to create a filtered list of pet food product. In some embodiments the at least one user preference comprises at least one preference selected from the group consisting of a grain preference, a protein preference, a food texture preference, a natural ingredient preference, and a shopping preference.

In some embodiments, the pet characteristics comprises one or more characteristics selected from the group consisting of a breed, a breed size, a pet size, a body condition, a life stage, an activity level, a pet gender, a pet gender status, and a weight of the pet.

In some embodiments, the method further comprises calculating one or more variances selected from the group consisting of a breed size variance, a pet size variance, a body condition variance, a life stage variance, an activity level variance, and a pet weight variance.

In some embodiments, the method further comprises calculating a plurality of variances to generate a plurality of calculated variances; and scoring the list of food products based on a sum of the calculated variances to identify one or more recommended pet food products.

In some embodiments, the method further comprises presenting the pet food recommendation to a user, wherein the pet food recommendation contains a plurality of pet food products; receiving a selection from the user of a selected pet food product from the plurality of pet food products; and generating a pet feeding recommendation based on the selected pet food product. In one embodiment, the pet feeding recommendation is generated based on a caloric density of the selected pet food product.

In some embodiments, the method further comprises storing behavioral data of the pet and/or a user in a historical database; and training one or both of the pet image recognition model and the pet food recommendation model based on the behavioral data stored in the historical database.

Another aspect of the disclosure is directed to a system comprising: a processor; and a memory storing instructions which, when executed by the processor, cause the processor to receive a pet image depicting a pet; analyze, with a pet image recognition model, the pet image to determine one or more pet characteristics of the pet; receive one or more pet-related data inputs; analyze with a pet food recommendation model, the pet characteristics and pet-related data inputs to generate a pet food recommendation for the pet and/or pet feeding recommendation for the pet.

In some embodiments of the system, the memory stores further instructions which, when executed by the processor, cause the processor to: analyze the pet image to identify one or more image characteristics of the pet image; and determine the one or more pet characteristics based on the image characteristics.

In some embodiments of the system, the memory stores further instructions which, when executed by the processor, cause the processor to: filter a list of pet food products based on at least one user preference to create a filtered list of pet food products.

In some embodiments of the system, the pet characteristics comprise one or more characteristics selected from the group consisting of a breed, a breed size, a body condition, a life stage, an activity level, a pet size, a pet gender, a pet gender status, and a weight of the pet.

In some embodiments of the system, the memory stores further instructions which, when executed by the processor, cause the processor to: calculate one or more variances selected from the group consisting of a breed size variance, a pet size variance, a body condition variance, a life stage variance, an activity level variance, and a pet weight variance.

In some embodiments of the system, the memory stores further instructions which, when executed by the processor, cause the processor to: calculate a plurality of variances to generate a plurality of calculated variances; and score a list of pet food products based on the sum of the calculated variances to identify one or more recommended pet food products.

In some embodiments of the system, the memory stores further instructions which, when executed by the processor, cause the processor to: present the pet food recommendation to a user, wherein the pet food recommendation contains a plurality of pet food products; receive a selection from the user of a selected pet food product from the plurality of pet food products; and generate a pet feeding recommendation based on the selected pet food product.

In some embodiments of the system, the memory stores further instructions which, when executed by the processor, cause the processor to: store behavioral data of the pet and/or a user in a historical database; and train one or both of the image recognition model and the pet food recommendation model based on the behavioral data store in the historical database.

Another aspect of the invention is directed to a non-transitory, computer-readable medium storing instructions which, when executed by a processor, cause the processor to: receive a pet image depicting a pet; analyze, with an image recognition model, the pet image to determine on or more pet characteristics of the pet; receive one or more pet-related data inputs; analyze with a pet food recommendation model, the pet characteristics and data inputs to generate a pet food recommendation for the pet.

In an embodiment, the pet food recommendation comprises one or more pet food products. In an embodiment, the pet food recommendation comprises a composition intended for consumption by a pet. In some embodiments, the pet food recommendation comprises one or more pet food products that a pet consumes as a main meal, including but not limited to dry, wet, semi-moist, moist, and liquid food compositions. In another embodiment, the pet food recommendation comprises a pet treat. In one embodiment, a treat is a food for consumption by a pet that is intended as an occasional reward or indulgence and not as the sole source of a pet's nutrition. In another embodiment, the pet food recommendation comprises a pet supplement. In one embodiment, a pet supplement is a composition for oral consumption offered separately from formulated food or treats, intended for an effect on the pet beyond normal nutritional needs. For example, supplementary products for pets may include those that confer benefits for the joints, skin, hair coat, and/or digestive system.

In an embodiment, personalized pet food recommendations and/or pet feeding recommendations may apply knowledge of food characteristics and attributes of pets and/or pet breeds to determine the best fit product and feeding recommendations.

In an embodiment, the personalized pet food recommendation and/or the pet feeding recommendation may utilize image recognition technology to determine multiple pet factors (i.e., pet breed, pet size, pet body condition) in conjunction with machine learning models that are configured to generate food recommendations based upon data obtained from an end user, data from the image recognition tools, and/or other data from an application of algorithms to account for an activity level and a life stage of a pet. In an embodiment, the image utilized by the image recognition tools is a static or still image (e.g. digital photo). In another embodiment, the image recognition technology utilizes a plurality of images or a dynamic image (e.g. multiple individual photos or a video).

In an embodiment, personalized pet food recommendations and/or pet feeding recommendations may be personalized and customized, incorporating a choice of pet food product as well as any previously entered pet variables (i.e., pet breed, pet size, pet body condition) to generate a recommendation for a daily pet food intake. In an embodiment, the daily pet food intake may be adjusted (e.g., to achieve a goal of pet weight gain, pet weight loss, or pet weight maintenance).

In an embodiment, personalized pet food recommendations and/or pet feeding recommendations may utilize artificial intelligence (e.g., image recognition) to determine a pet species and/or a pet breed to incorporate that information into the pet food recommendation and/or the pet feeding recommendation.

In an embodiment, personalized pet food recommendations and/or pet feeding recommendations may utilize machine learning to optimize the pet food recommendation and pet feeding recommendation over time. For example, machine learning models may be configured to generate one or both of the pet food recommendation and the pet feeding recommendation and may incorporate feedback on the quality of recommendations and actual performance information provided by a pet owner and/or other user (e.g., a veterinarian).

In an embodiment, a device may be configured to provide personalized pet food recommendations and/or pet feeding recommendations. In such an embodiment, the device may be further configured to track the achievement of goals related to pet body condition over time and influence the pet food product selection and pet food feeding regimen based on the goals.

In an embodiment, personalized pet food recommendations and/or pet feeding recommendations may utilize connected pet devices (e.g., collars, bowls, scoops, litter boxes, water dispensers, cameras, fences, scales, bins, mats, beds) to automatically collect and transmit data used to provide the personalized pet food recommendations and/or pet feeding recommendations. The data used to provide the personalized pet food recommendations and/or pet feeding recommendations may be relevant to identifying changes in pet food product or pet food feeding choices over time. Such a configuration may eliminate sources of error or lapses in time inherent with manual data input (e.g., data input by a user and/or pet owner), which may enable more proactive personalizing of pet food recommendations and pet feeding recommendations.

In an embodiment, personalized pet food product recommendations and/or pet feeding recommendations may utilize artificial intelligence and machine learning to assess pet waste characteristics and translate the pet waste characteristics into the personalized pet food recommendations and/or pet feeding recommendations.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Detailed embodiments of devices and methods are disclosed herein. However, it is to be understood that the disclosed embodiments are merely exemplary of the devices and methods, which may be embodied in various forms. Therefore, specific functional details disclosed herein are not to be interpreted as limiting, but merely as a basis for the claims as a representative example for teaching one skilled in the art to variously employ the present disclosure.

As used herein, "about," "approximately," and "substantially" are understood to refer to numbers in a range of numerals, for example the range of −10% to +10% of the referenced number, preferably −5% to +5% of the referenced number, more preferably −1% to +1% of the referenced number, most preferably −0.1% to +0.1% of the referenced number. All numerical ranges herein should be understood to include all integers, whole or fractions, within the range. Moreover, these numerical ranges should be construed as providing support for a claim directed to any number or subset of numbers in that range. For example, a disclosure of from 1 to 10 should be construed as supporting a range of from 1 to 8, from 3 to 7, from 1 to 9, from 3.6 to 4.6, from 3.5 to 9.9, and so forth.

As used herein, the singular forms "a," "an" and "the" include plural referents unless the context clearly dictates otherwise. For example, reference to "an ingredient" or "a method" includes a plurality of such "ingredients" or "methods." The term "and/or" used in the context of "X and/or Y" should be interpreted as "X," or "Y," or "X and Y." Similarly, "at least one of X or Y" should be interpreted as "X," or "Y," or "both X and Y."

The preferred embodiments relate to devices and methods that provide personalized pet food recommendations and/or pet feeding recommendations to a user and/or pet owner.

As described herein, robust data at the individual pet and person level, along with artificial intelligence and machine learning, may assist the devices and methods disclosed herein. In broad, basic terms, "artificial intelligence" refers to techniques that enable computers to mimic the human capabilities of sensing, problem solving, acting, adapting, and improving over time with experience. Image recognition and natural language processing may be considered two specific examples or types of artificial intelligence that convert aspects of their environment into pieces of information that may be provided as inputs into computer-implemented algorithms. Machine learning techniques may help adapt and improve an algorithm's performance of a task or an ability to achieve a desired outcome over time based on historical data.

As used herein, "species" refers to the commonly associated name of the species of the pet. For example, a Golden Retriever is of the species "dog," a Maine Coon is of the species "cat," and a Blue Tang is of the species "fish."

As used herein, "life stage" refers to the relative stage of a pet in the pet's lifecycle. For example, dogs may have life stages including "puppy," "adult" and "senior." Cats may have life stages including "kitten," "adult," and "senior."

As used herein, "breed size" refers to the relative size of a given pet breed when compared to other pet breeds of the same species. Example breed sizes may include toy, small, medium, large, and giant. For example, a Chihuahua may be considered a toy breed, while a Great Dane may be considered a giant breed. In some instances, a pet may not be easily categorized within a specific breed. In such instances, a pet may be more generally categorized according to size (e.g. small, medium or large pet).

As used herein, "breed size variance" or "pet size variance" refers to a measure of how closely a given pet food product is designed for a particular breed size or pet size. Pets of a different breed size or pet size may have different needs. For example, dogs of a toy or small size may need a lower caloric intake, typically expressed as energy intake over time, e.g. 150 kcal/day. Additionally, the caloric density of the food which reflects the caloric content in a given volume, e.g. 150 kcal/cup, influences the recommendation of how much of the food to feed in a given time to achieve the caloric intake. Comparatively, dogs of a large or giant breed size may need food that helps account for certain health characteristics correlated with their size (e.g., foods with included supplementation to account for hip or digestive issues common with large or giant-sized dog breeds).

For example, the breed size variance (BSV) may be calculated for a pet food product relative to a given breed size according to the formula:

$$BSV = \frac{PF}{(M+1)}$$

where PF is a prioritization factor, and where M is determined based on the breed size for which the pet food product is intended relative to the given breed size. For example, for a specified breed size, food products targeting the specified breed size may be assigned an M value of 0, food products targeting all breed sizes may be assigned in an M value of 1, and food products targeting breed sizes neighboring the specified breed size may receive an M value of 2. As another example, in such an implementation, where the specified breed size is small, the pet food products targeted to the small breed size will receive an M value of 0, pet food products targeting all breed sizes will receive an M value of 1, and pet food products targeting toy and medium breed sizes will receive an M value of 2 as shown in the table below:

| Breed Size | M Value |
| --- | --- |
| Small | 0 |
| All Breeds | 1 |
| Small and Medium | 2 |

The prioritization factor may reflect a relative importance of the breed size variance in subsequent calculations (e.g., when scoring pet food products to generate a pet food recommendation). Pet size variance may be similarly calculated.

In certain implementations, where breed size variance or pet size variance is highly important to subsequent calculations, the prioritization factor may be set at 10 (out of a maximum of 10). In such an implementation, and continuing the preceding example, pet food products targeting the small breed size will have a breed size variance of BSV =10/(0+1)=10, pet food products targeting all breed sizes will have a breed size variance of BSV=10/(1+1)=5, and pet food products targeting toy and medium breed sizes will have a breed size variance of BSV=10/(2+1)=3.33. Pet food products targeting further than neighboring breed sizes (i.e., large and giant breed sizes for small breed calculations) may be ignored in the breed size variance calculation.

As used herein, "body condition variance" refers to a measure of how closely a given pet food product is designed for pets of a given body condition. For example, pets that are overweight may require a lower caloric intake than pets at an ideal body weight, so pet food products designed for overweight pets may have lower calorie density. With all other conditions being equal, a lower caloric intake and/or caloric density may help the pet lose weight to restore the pet to an ideal body weight. Similarly, pets that are underweight may require a higher caloric intake than pets that are at an ideal body weight. Accordingly, pet food products designed for underweight pets may have a higher calorie density to help underweight pets gain weight and return to an ideal body weight. Therefore, the body condition variance of a given pet food product may be calculated on the caloric density of the pet food product.

For example, the body condition variance (BCV) may be calculated for a given pet food product relative to the caloric density of the pet food product according to the formula:

$$BCV = \frac{PF}{(|FAV - M|+1)}$$

where PF is a prioritization factor, FAV is a food assigned value and is determined based on the caloric density of the pet food product, and M is selected based on a given body condition. For example, FAV may be assigned based on the caloric density (calories/cup) of the pet food product according to the table below:

| Calories/Cup | 100 | 125 | 200 | 300 |
| --- | --- | --- | --- | --- |
| FAV | 0 | .25 | 1 | 2 |

Similarly, the M value may be calculated based on a given body condition according to the table below:

| Body Condition | M Value |
| --- | --- |
| Overweight | 0 |
| Ideal | 1 |
| Underweight | 2 |

The prioritization factor may reflect a relative importance of the body condition variance in subsequent calculations (e.g., when scoring pet food products to generate a pet food recommendation). In certain implementations, where body condition variance is important to subsequent calculations, but not as important as breed size variance, the prioritization factor may be set at 9 (out of a maximum of 10). In such implementations, for an overweight pet (i.e., M=0), the pet food product with the highest caloric density would have a body condition variance of BCV=9/(|2−0|+1)=4.5 and the pet food product with the lowest caloric density would have a body condition variance of BCV=9/(|0−0|+1)=9.

As used herein, "life stage variance" refers to a comparison between the life stage of the pet and the pet life stage for which a pet food product is targeted. For example, younger pets may require food with higher caloric density, as such pets are still growing and generally very active, whereas older pets may require food with a lower caloric density, as older pets may typically be less active. Additionally, older pets may require food that accounts for health issues associated with their older age (e.g., joint issues, digestive issues, heart issues). The life stage variance may therefore be calculated relative to the pet's given life stage.

For example, the life stage variance (LSV) may be calculated according to the formula:

$$LSV = \frac{PF}{(M+1)}$$

where PF is a prioritization factor, and where M is determined based on the pet's life stage and the life stage for which the pet food product is intended. For example, similar to the breed size variance discussed above, for a specified life stage, food products targeting the same life stage may be assigned an M value of 0, food products targeting all life stages may be assigned in M value of 1, and pet food products targeting life stages the neighboring the specified life stage may receive fan M value of 2. Pet food products intended for other life stages than those discussed here may be excluded from the calculation. As another example, in such an implementation, where the specified life stage is puppy or kitten, then pet food products intended for puppies or kittens are assigned an M value of 0, pet food products targeting all life stages are assigned an M value of 1, and pet food products targeting the adult life stage are assigned an M value of 2 as shown in the table below:

| Life Stage | M Value |
| --- | --- |
| Puppy | 0 |
| All | 1 |
| Adult | 2 |

Pet food products targeting the senior life stage may be excluded from the calculation and from potential pet food recommendations. The prioritization factor may reflect a relative importance of the life stage variance in subsequent calculations (e.g., when scoring pet food products to generate a pet food recommendation). In certain implementations, where life stage variance is relevant to subsequent calculations, but less important than breed size variance and body condition variance, the prioritization factor may be set at 8 (out of a maximum of 10). In such implementations, and continuing the preceding example, pet food products targeting puppies or kittens will have a life stage variance of LSV=8/(0+1)=8, pet food products targeting all life stages will have a life stage variance of LSV=8/(1+1)=4, and pet food products targeting adult life stages will have a life stage variance of LSV=8/(2+1)=2.67.

As used herein, "activity level variance" refers to a comparison between the activity level of the pet and a pet food product's caloric content. Pets that are more active may generally require a higher caloric intake to avoid losing too much weight and may therefore require pet food products with higher calorie densities. Similarly, pets that are less active may generally require fewer calories to avoid gaining too much weight and may therefore require pet food products with lower calorie densities. The activity level variance for a pet food product may therefore be calculated relative to a specified activity level.

For example, the activity level variance (ALV) may be calculated for a given pet food product relative to an activity level according to the formula:

$$ALV = \frac{PF}{(|FAV - M|+1)}$$

where PF is a prioritization factor, FAV is a food assigned value and is determined based on the caloric density of the pet food product, and M is selected based on a given activity level. For example, FAV may be assigned based on the caloric density (calories/cup) of the pet food product according to the table provided above in connection with the body condition variance. Similarly, the M value may be calculated based on a given activity level according to the table below:

| Active Level | M Value |
| --- | --- |
| Less Active | 0 |
| Semi Active | 1 |
| Active | 2 |
| Highly Active | 3 |

The prioritization factor may reflect a relative importance of the activity level variance in subsequent calculations (e.g., when scoring pet food products to generate a pet food recommendation). In certain implementations, where activity level variance is less important than breed size variance, body condition variance, and life stage variance, the prioritization factor for activity level variance may be set at 5 (out of a maximum of 10).

In such implementations, for a less active pet (i.e., M=0), the activity level variance for a pet food product with the highest caloric density would be ALV=5/(|3−0|+1)=1.25 and the activity level variance for a pet food product with the lowest caloric density would be ALV=5/(|0−0|+1)=5

As used herein, "pet weight variance" refers to a comparison between the actual weight of the pet and the expected weight of the pet for the breed(s) of the pet and the caloric content of the pet food. Pets that are overweight relative to their breeds may require pet food products with lower caloric density than pets at an ideal weight for their breed(s). Similarly, pets that are underweight relative to their breed(s) may require foods with higher caloric density than pets at an ideal weight. Accordingly, the pet weight variance may be calculated relative to a specified weight of a pet relative to its breed.

For example, the pet weight variance (PWV) may be calculated relative to a pet weight according to the formula:

$$PWV = \frac{PF}{(|FAV - M|+1)}$$

where PF is a prioritization factor, FAV is a food assigned value and is determined based on the caloric density of the pet food product, and M is selected based on a given pet weight status. For example, FAV may be assigned based on the caloric density (calories/cup) of the pet food product according to the table provided above in connection with the body condition variance. Similarly, the M value may be calculated based on a given activity level according to the table below:

| Weight Condition | M Value |
| --- | --- |
| Overweight | 0 |
| Ideal | 1 |
| Underweight | 2 |

In certain implementations, calculating the pet weight variance may further include calculating the pet's weight condition. For a given pet weight (PW), the weight condition (WC) may be calculated according to the formula:

$$WC = \frac{PW}{ACW}$$

where ACW is the average calculated weight of the pet's breed. For pets with a single breed, the ACW may equal the average of the minimum and maximum healthy weights for the breed. For pets with more than one breed, the ACW may equal the average of each breed's minimum and maximum weights. If the WC is greater than 1, the pet may be considered overweight, if the WC is less than 1, the pet may be considered underweight, and if the WC is approximately 1 (e.g., 0.95-1.05), the pet may be considered at an ideal weight. The prioritization factor may reflect a relative importance of the pet weight variance in subsequent calculations (e.g., when scoring pet food products to generate a pet food recommendation). In certain implementations, where pet weight variance is less important than breed size variance, body condition variance, life stage variance, and activity level variance, the prioritization factor for pet weight variance may be set at 1 (out of a maximum of 10).

In such implementations, for an overweight pet (i.e., M=0), the pet food product with the highest caloric density would have a pet weight variance of PWV=1/(|2−0|+1)=0.33 and the pet food product with the lowest caloric density would have a pet weight variance of PWV=1/(|0−0|+1)=1.

As used herein, "grain preference" refers to a preference of the user or of the pet for the grain contents of a pet food product. In certain implementations, the grain preference may include (i) that pet food products containing grain are preferred, (ii) that pet food products containing grain are disfavored or that grain-free pet food products are preferred, and (iii) no preference for the grain content of pet food products.

As used herein, "protein preference" refers to a preference of the user or of the pet for protein contents of a pet food product. In certain implementations, the protein preference may include (i) that pet food products containing poultry (e.g. chicken, duck or turkey) are preferred, (ii) that pet food products containing beef are preferred, (iii) that pet food products containing pork are preferred, (iv) that pet food products containing fish are preferred, (v) that pet food products containing plant-based proteins are preferred, and (vi) no preference for the protein content of pet food products.

As used herein, "food texture preference" refers to a preference of the user or of the pet for the texture of a pet food product. In certain implementations, the food texture preference may include (i) that wet pet food products are preferred, (ii) that dry pet food product are preferred, and (iii) no preference for the food texture of pet food products.

As used herein, "natural ingredient preference" refers to a preference of the user or of the pet for the texture of a pet food product. In certain implementations, the natural ingredient preference may include (i) a preference for pet food products that contain natural ingredients, (ii) a preference for pet food products without natural ingredients, and (iii) no preference for the natural ingredient contents of pet food products.

As used herein, "shopping preference" refers to a preference of the user for the shopping availability for a pet food product. In certain implementations, the shopping preference may include (i) a preference for products that are available online (or both online and in stores), (ii) a preference for products that are available in stores (or both in stores and online), and (iii) no preference for the shopping availability of pet food products.

The preferred embodiments relate to methods and devices for determining a pet food and/or a pet feeding schedule.

Figure 1:
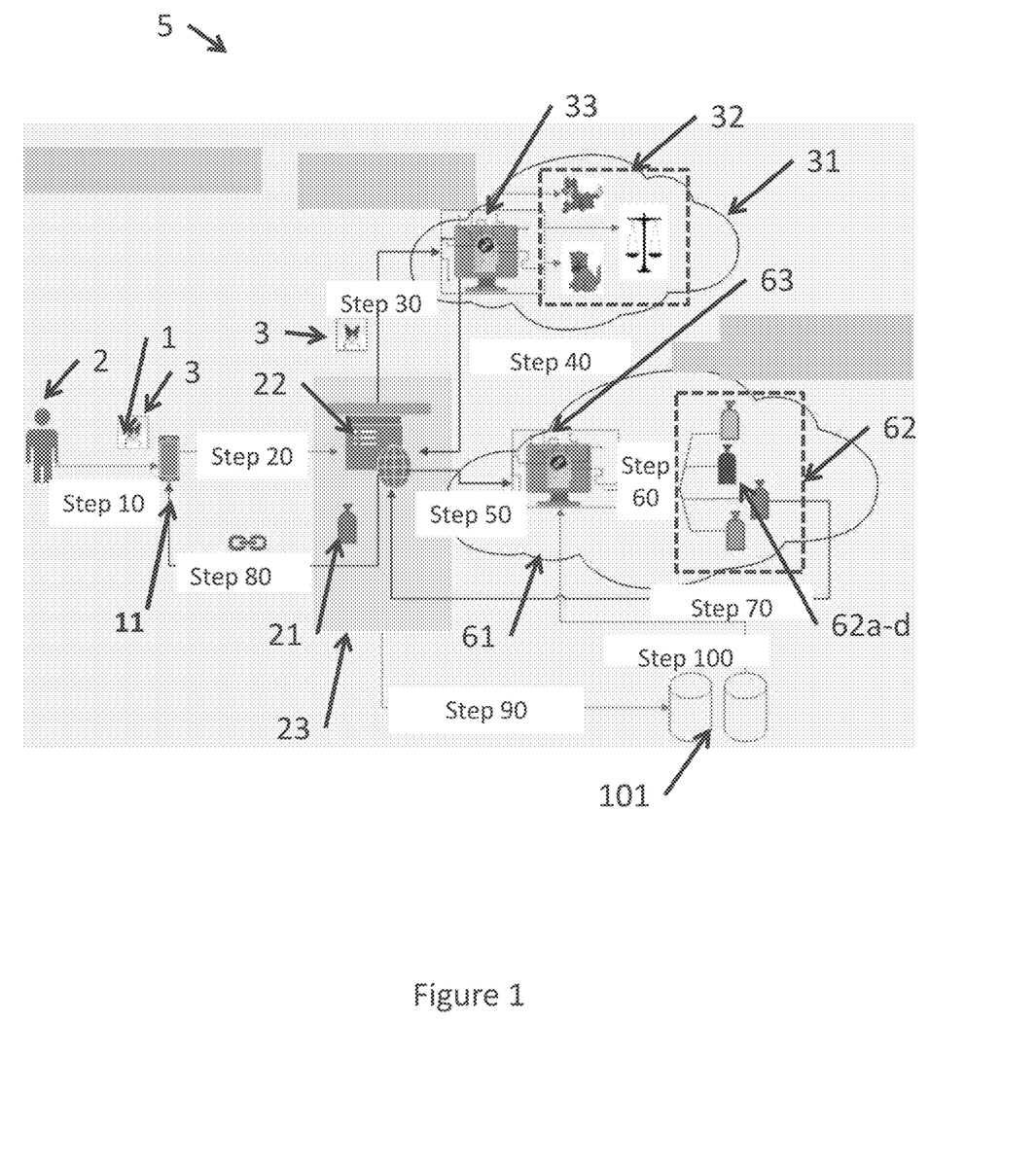
FIG. 1 illustrates a flowchart of an embodiment of a system and method for providing personalized pet food recommendations and/or pet feeding recommendations according to the present disclosure.

FIG. 1 generally illustrates an embodiment of a system 5 for determining a recommended pet food 21 for a pet 1. For example, a user 2, who may own the pet 1, may desire to purchase food for the pet 1. However, the user 2 may not know the exact type of food best suited for the needs of the pet 1 and/or or the recommended feeding schedule of the food for the pet 1. Accordingly, the user 2 may use the system 5 to determine the pet food recommendation and/or the pet feeding recommendation 21 for the pet 1.

The system 5 may include an interface 22. In some embodiments, the interface is a web interface. The web interface 22 may be implemented by a web interface server 23. For example, the web interface server 23 may provide the web interface 22 upon receiving a request from a user device 11. The user device 11 may be implemented as, e.g., a cell phone, smart phone, smart watch, laptop, tablet, personal digital assistant (PDA), and/or desktop computer. The user device 11 may be capable of taking a pet image 3 of the pet. In another embodiment, the user device 11 may additionally or alternatively store the pet image 3 of the pet 1. The interface 22 of the system 5 may be capable of receiving the pet image 3. For example, the user 2 may be able to upload the pet image 3 to the interface 22. The user device 11 may communicate with the interface 22 and/or the interface server 23 via a network connection, such as a network connection over the Internet. In certain implementations, the user device 11 may communicate with a wired or wireless network connection (e.g., a network connection over Wi-Fi, Bluetooth, Ethernet, cellular data connections). In still further implementations, functionalities of one or both of the interface 22 and the interface server 23 may be implemented by the user device 11 (e.g., as a program or application executing on the user device). In other embodiments, the interface is a voice interface, a mobile phone application, a chatbot integration, or other user interfaces to web and/or cloud solutions.

Additional or alternative inputs may be received by the interface 22. For example, the interface 22 may additionally or alternatively receive information regarding a pet breed, a pet weight, a pet activity level, a pet gender, a pet gender status (e.g. spayed/neutered), a pet environment/climate, current/previous supplements taken by the pet, current/previous pet diet, eating habits, desired health outcomes, a user and/or pet ingredient preference, and/or a shopping preference. The additional information regarding the pet may be provided by a user (e.g. pet owner or veterinarian). The additional information may also be obtained from a historical database or even received remotely from devices on the pet (e.g. collar) or in the pet environment (e.g. food bowl or litter box).

In an embodiment where the interface 22 receives the pet image 3, the pet image 3 may be communicated to a pet image recognition model 33. The pet image recognition model 33 may analyze the pet image 3 to determine the pet species/breed, the life stage of the pet, and/or the size of the pet by analyzing the pet image 3 for one or more pet characteristics. The pet image recognition model 33 may produce a pet image recognition result 32. The pet image recognition result 32 may include the breed/pet size variance, the body condition variance, the activity variance, the pet weight variance and/or the life stage variance. The pet image recognition result 32 may then be communicated back to the interface 22.

In certain implementations, as depicted in FIG. 1, the pet image recognition model 33 may be implemented on a cloud server 31. For example, the pet image recognition model 33 may be implemented by a cloud server provided by a cloud services provider (e.g. Google Cloud Platform Services).

The system 5 may then communicate the pet image recognition result 32 to a pet food recommendation model 63. In certain implementations, this communication may be indirect. For example, as depicted in FIG. 1, the cloud server 31 and/or the image recognition model 33 may communicate the pet image recognition result 32 to the pet food recommendation model 63 indirectly via the interface 22 and/or the interface server 23. In some implementations, the cloud server 31 and/or the image recognition model 33 may communicate the pet image recognition result 32 to the pet food recommendation model 63 directly (e.g., via a communication link between the cloud server 31 and the cloud server 61).

The pet food recommendation model 63 may then use the pet image recognition result 32 and/or other information provided from the user or stored by the pet food recommendation model 63 to determine a pet food recommendation result 62. The pet food recommendation result 62 may be selected by the pet food recommendation model 63 from a list of pet food products, for example pet foods 62a, 62b, 62c, and 62d by analyzing the image recognition result 32. For example, and as explained in greater detail below, the pet food recommendation model 63 may calculate one or more of the breed/pet size variance, the body condition variance, the life stage variance, the activity level variance, and the pet weight variance based on pet characteristics included within the image recognition result 32 or provided by the user 2.

In an embodiment, the pet food 62a may comprise a high-fat pet food, the pet food 62b may comprise a gluten-free pet food, the pet food 62c may comprise a low-sugar pet food, and the pet food 62a may comprise a meat-free pet food. When the pet food recommendation result 62 is determined by the pet food recommendation model 63, the pet food recommendation result 62 may then be communicated to the interface 22. In other implementations, the pet food recommendation result 62 may include more than one pet food 62a-d. For example, the pet food recommendation model 63 may select more than one pet food 62a, 62b, 62c, and 62d that meets the provided preferences of the user and may include the selected pet foods 62a, 62b, 62c, and 62d in the pet food recommendation result 62 for selection by the user. In some embodiments, when multiple pet food products are presented as part of the pet food recommendation, the products can be prioritized based on documented logic within the model.

In certain implementations, as depicted in FIG. 1, the pet food recommendation model 63 may be implemented on a cloud server 61. For example, the pet food recommendation model 63 may be implemented by a cloud server 61 provided by a cloud services provider (e.g. Google Cloud Platform Services).

The interface 22 may use the pet food recommendation result 62 to suggest the recommended pet food 21 to the user 2. The interface 22 may further provide a link to purchase the recommended pet food 21, along with a suggested feeding schedule based on the pet image recognition result 32 and the pet food recommendation result 62.

The interface 22 may collect data regarding the pet image recognition result 32 and the pet food recommendation result 62. For example, the user 2 may be able to provide feedback relating to the recommended pet food 21, such as the impact of the recommended pet food 21 on weight gain and/or loss of the pet 1, on changes in appearance of the pet 1 and/or whether the pet 1 seemed to enjoy eating the recommended pet food 21. In addition, the interface 22 may receive data from other sources, including smart collars used to track the movement of the pet 1, smart feeding bowls used to feed the pet 1, smart scales to record a weight of the pet, veterinary history of the pet 1, subsequent pet image recognition results 32 for the pet 1 and/or updated preferences for the pet 1 input by the user 2. Such feedback may be generally referred to as "historical data" for training and optimization of the pet food recommendation model 63.

The historical data for training and optimization of the pet food recommendation model may be stored in a historical database 101. The historical data for training and optimization of the pet food recommendation model may be used in the pet food recommendation model 63 to provide the recommended pet food 21 most likely to satisfy the requests and preferences of the user 2 and/or the needs of the pet 1, as explained in greater detail below.

In certain embodiments, the system 5 may include one or more components implemented by a computer system including a CPU and a memory. For example, one or more components of the system 5 may include a memory storing instruction which, when executed by a CPU, cause the CPU to implement one or more functions of the component. As another example, one or more of the user device 11, interface server 23, cloud servers 31, 61, and historical database 101 may be implemented as at least one computer system. In certain implementations, each of these components may be implemented by a separate computer system. In other implementations, one or more of the components may be implemented by a single computer system. For example, the interface server 23 and user device 11 may be implemented by the same computer system. As another example, the cloud servers 31, 61 may be implemented by the same computer system in certain implementations.

Additionally, one or more components of the system 5 may communicate over a network, such as a public or private network. For example, the user device 11, interface server 23, cloud servers 31, 61, and historical database 101 may communicate over the Internet. The components may communicate over one or more wired or wireless network interfaces, including, but not limited to, Ethernet, Wi-Fi, Bluetooth, and cellular data networks.

FIG. 1 also generally illustrates an embodiment of a method for providing the recommended pet food 21 to the user 2. The method may be implemented on a computer system, such as the system 5. For example, the method may be implemented by the user device 11, interface server 23, cloud servers 31, 61, and historical database 101. The method may also be implemented by a set of instructions stored on a computer readable medium that, when executed by a processor, cause the computer system to perform the method. For example, all or part of the method may be implemented by a CPU and a memory.

Although the examples below are described with reference to the flowchart illustrated in FIG. 1, many other methods of performing the acts associated with FIG. 1 may be used. For example, the order of some of the steps may be changed, certain steps may be combined with other steps, one or more of the steps may be repeated, and some of the steps described may be optional. In certain implementations, the steps of the method may preferably be performed in the depicted order without intervening steps.

In Step 10, the interface 22 may receive a notification from the user 2 (e.g., a notification submitted via the user device 11) that the user 2 wishes to be provided with the recommended pet food 21.

In Step 20, the interface 22 may receive preference information, such as the user 2's or pet 1's grain preference, protein preference, food texture preference, natural ingredient preference, and/or shopping preference. The interface 22 may use this information to personalize the pet food recommendation result 62 for the pet and the pet owner, and/or other pet and/or pet food preferences. The interface 22 may also be configured to receive the pet image 3 of the pet 1. As further explained below, the interface 22 may also receive data about the pet 1, such as data regarding one or more of the pet 1's sex, breed, or age.

In Step 30, the interface 22 may communicate the pet image 3 to the pet image recognition model 33. The pet image recognition model 33 may analyze the pet image 3 to determine the pet image recognition result 32 based on the pet image 3. For example, the pet image recognition model 33 may analyze the pet image 3 to identify one or more image characteristics of the pet image 3. For example, the pet image recognition model 33 may be implemented as a machine learning model, such as a two-dimensional machine learning model (e.g., a recurrent neural network or a convolutional neural network). The pet image recognition model 33 may be trained on training pet images, which may be prepared or otherwise collected from previously-submitted pet images 3, as discussed below. During training, the pet image recognition model 33 may be configured to identify the image characteristics or may otherwise develop the image characteristics for identification within the pet image 3 based on the training process. Example image characteristics may include the outline of the pet 1, the area enclosed by the outline of the pet 1, the percentage of pixels of the pet image 3 occupied by the pet 1, and one or more geometric dimensions of the pet 1 within the pet image 3 (e.g., length, height, distance from foot to shoulder, distance from back to stomach, chest breadth, chest depth).

The image characteristics may then be analyzed to generate the image recognition result 32. The image recognition result 32 may include one or more pet characteristics of the pet 1, such as the height, weight, length, breed, breed size, pet size, activity level, life stage, and/or body condition of the pet 1. The image characteristics may suggest or otherwise indicate the presence of one or more pet characteristics of the pet 1. In certain implementations, for example, during training the pet image recognition model 33 may identify a relationship between the outline of the pet 1 within the pet image 3 and one or more pet characteristics of the pet 1. For example, a larger boundary may suggest one or both of a higher weight for the pet 1 or a larger breed size for the pet 1. As another implementation, the pet image recognition model 33 may identify a relationship between the size or coloring of the pet 1 in the pet image 3 and the breed of the pet 1. For example, the pet image recognition model 33 may determine that a pet 1 that is large and spotted black and white is a Dalmatian based on previous training. In another embodiment, the pet image recognition model may take other features of the image into consideration, such as, coat characteristics and/or facial features to determine a breed of a pet.

The pet image recognition model 33 may be configured to generate or predict certain pet characteristics depending on the pet characteristics for inclusion within the pet image recognition result 32 that are relevant to the pet food recommendation model's 63 subsequent processing. For example, the pet food recommendation model 63 may calculate a breed size variance and may therefore rely on an estimation of the breed size of the pet 1 in generating a pet food recommendation result. In such an implementation, the pet image recognition model 33 may therefore be configured to estimate the breed size of the pet 1 based on the pet image 3 and to include the breed size estimation within the image recognition result 32.

In certain implementations, the pet image recognition model 33 may be implemented as more than one machine learning model. For example, the pet image recognition model 33 may include a first machine learning model configured to identify the image characteristics of the pet image 3 and a second machine learning model configured to analyze the image characteristics and identify the pet characteristics of the pet 1. In still further implementations, the pet image recognition model 33 may be implemented by a single machine learning model. For example, the pet image recognition model 33 may include a single machine learning model configured to both identify the image characteristics within the pet image 3 and to estimate the pet characteristics of the pet 1 based on the image characteristics. In yet another example, the pet image recognition model 33 may not estimate the image characteristics and may instead include a single machine learning model configured to estimate the pet characteristics of the pet 1 based on the pet image 3 directly.

In Step 40, the pet image recognition result 32 may be communicated to the interface 22. In an embodiment, the image recognition result 32 may be communicated to the pet food recommendation model 63 without first being communicated to the interface 22.

In Step 50, the pet food recommendation model 63 may receive the pet image recognition result 32. The pet image recognition result 32 may be received from the interface 22, the pet image recognition model 33, and/or another location.

In Step 60, the pet food recommendation model 63 may analyze the pet image recognition result 32 to determine the pet food recommendation result 62. The pet food recommendation model 63 may analyze pet characteristics included in the pet image recognition result 32. The pet food recommendation model 63 may analyze pet characteristics included in the pet image recognition result and data inputs provided to the interface 22 to determine the pet food recommendation result. For example, the image recognition result 32 may include one or more of the breed, breed size, pet size, body condition, life stage, activity level, and weight of the pet 1 and the data inputs may include one or more of pet gender, pet gender status, weight of pet, sensitivity of pet, health condition of pet, environment of pet, current/previous supplement use, current/previous diet, eating habits, and/or desired health outcomes which the pet food recommendation model 63 may use to calculate one or more variances, such as the breed/pet size variance, the body condition variance, the life stage variance, the activity level variance, and/or the pet weight variance. The pet food recommendation model 63 may then score pet food products based on a sum of the one or more variances.

In certain implementations, the pet food recommendation model 63 may be configured to (i) filter a list of pet food products to create a filtered list of pet food products based on one or more user preferences and (ii) sort the filtered list of pet food products. For example, a user 2 may provide one or more preferences to filter the pet food products provided in the pet food recommendation result. In some embodiments, a user 2 may provide a grain preference, a protein preference (e.g. chicken, beef, pork), a food texture preference (e.g. wet vs dry), a natural ingredient preference, a shopping preference, and/or other additional variables that may be useful to create a filtered list of pet food products. The filtered list of pet food products may then be sorted using one or multiple criteria chosen by the user, for example, price, availability, and/or brand.

In still further implementations, or in addition to the above implementations, the pet food recommendation model 63 may include a machine learning model that generates the pet food recommendation result 62. For example, the machine learning model may be trained to determine the prioritization factors of the one or more variances.

The pet food recommendation result 62 may be the recommended pet food 21 selected from the pet foods 62a-d. In other implementations, as discussed above, the pet food recommendation result 62 may include a plurality of pet foods 62a-d for selection by a user 2.

In certain embodiments, the pet food recommendation result 62 may also include a pet feeding recommendation. For example, after the pet foods 62a-d have been identified, the pet food recommendation model 63 may determine a pet feeding recommendation based on the caloric density of the pet foods 62a-d. For example, the pet food recommendation model 63 may determine a feeding recommendation based on a combination of factors, including desired caloric intake and/or caloric density of the product selected for the pet 1 based on pet characteristics of the pet 1 (e.g., the pet breed, the breed size, body condition, life stage, activity level, and/or weight of the pet 1). The pet food recommendation model 63 may then determine how much of each pet food 62a-d is required to reach the desired caloric intake of the pet 1 based on the caloric density (e.g., by dividing the desired caloric intake by the pet foods' 62a-d caloric density). The pet food recommendation model 63 may then split the food into a certain number of desired or recommended meals per day (e.g., 2 meals per day) for the pet 1. In certain implementations, the pet food recommendation model may not generate the pet feeding recommendation until after a user has selected a pet food 62a-d from the pet foods 62a-d included within the pet image recognition result. For example, the pet food and feeding recommendation can be directed to achieving an ideal body condition score within a defined period of time (e.g. 6 weeks or 10 weeks) as determined by weight maintenance, weight loss or weight gain.

In Step 70, the pet food recommendation result 62 may be received by the interface 22. In one embodiment, the interface is a web interface. In other embodiments, the interface is a chat, voice, or mobile application.

In Step 80, the pet food recommendation result 62 may be communicated from the interface 22 to the user device 11 and/or to the user 2. The pet food recommendation result 62 may be in the form of the recommended pet food 21. In an embodiment, the recommended pet food 21 is two or more different pet foods. In an embodiment, the recommended pet food 21 is two or more pet food brands. In an embodiment, the recommended pet food 21 is a single pet food and/or a single pet food brand.

In Step 90, a historical database 101 may receive behavioral data for training and optimization of the pet food recommendation model 63 and/or the image recognition model 33. For example, the pet image 3 may be stored in a historical database and may be manually tagged or analyzed and provided to the image recognition model 33 for training. In certain embodiments, a subject matter expert may review the pet image 3 to identify one or more pet characteristics of the pet 1 or image characteristics of the pet image 3 and may tag the pet image 3 with the identified pet characteristics. The image recognition model 33 may then be trained on the pet image 3, in combination with a plurality of other pet images 3. For example, the image recognition model 33 may adjust itself (e.g., one or more weights or factors within the image recognition model) to maximize the accuracy of the detected image characteristics or pet characteristics.

In another example, the food recommendation model 63 may analyze behavioral data of the user 2 or the pet 1 (e.g., whether the user 2 purchased the recommended pet food 21, subsequent weight loss or gain by the pet 1, subsequent pet 1 activity level) and may update one or more model parameters (e.g., the prioritization factors for the variances) to maximize the accuracy of the recommended pet food 21. Such data may come from user interaction with the solution via web activity tagging, cookies, e.g., user surveys, purchase records, and subsequently-submitted pet images 3. The food recommendation model 63 may also analyze behavioral data about the pet 1 (e.g., whether the pet 1 achieved desirable changes in body condition, whether the pet 1 like the recommended pet food 21). Such data may come from connected pet devices (e.g., collars, bowls, scoops, litter boxes, water dispensers, cameras, scales, bins, mats, beds) that automatically collect and transmit data used to provide the personalized pet food recommendations and/or pet feeding recommendations. In certain implementations, the food recommendation model 63 may be optimized to improve one or more of whether the user 2 purchases the recommended pet food 21, whether the pet 1 experiences a desired change in weight after eating the recommended pet food 21, whether the pet 1 likes the recommended pet food 21, and whether the user continues to utilize the system 5 to generate pet food recommendation results 62.

In Step 100, the behavioral data for training and optimization of the pet food recommendation model 63 may be communicated to the pet food recommendation model 63 to provide the recommended pet food 21 most likely to satisfy the requests and preferences of the user 2 and/or the needs or preferences of the pet 1.

Figure 2:
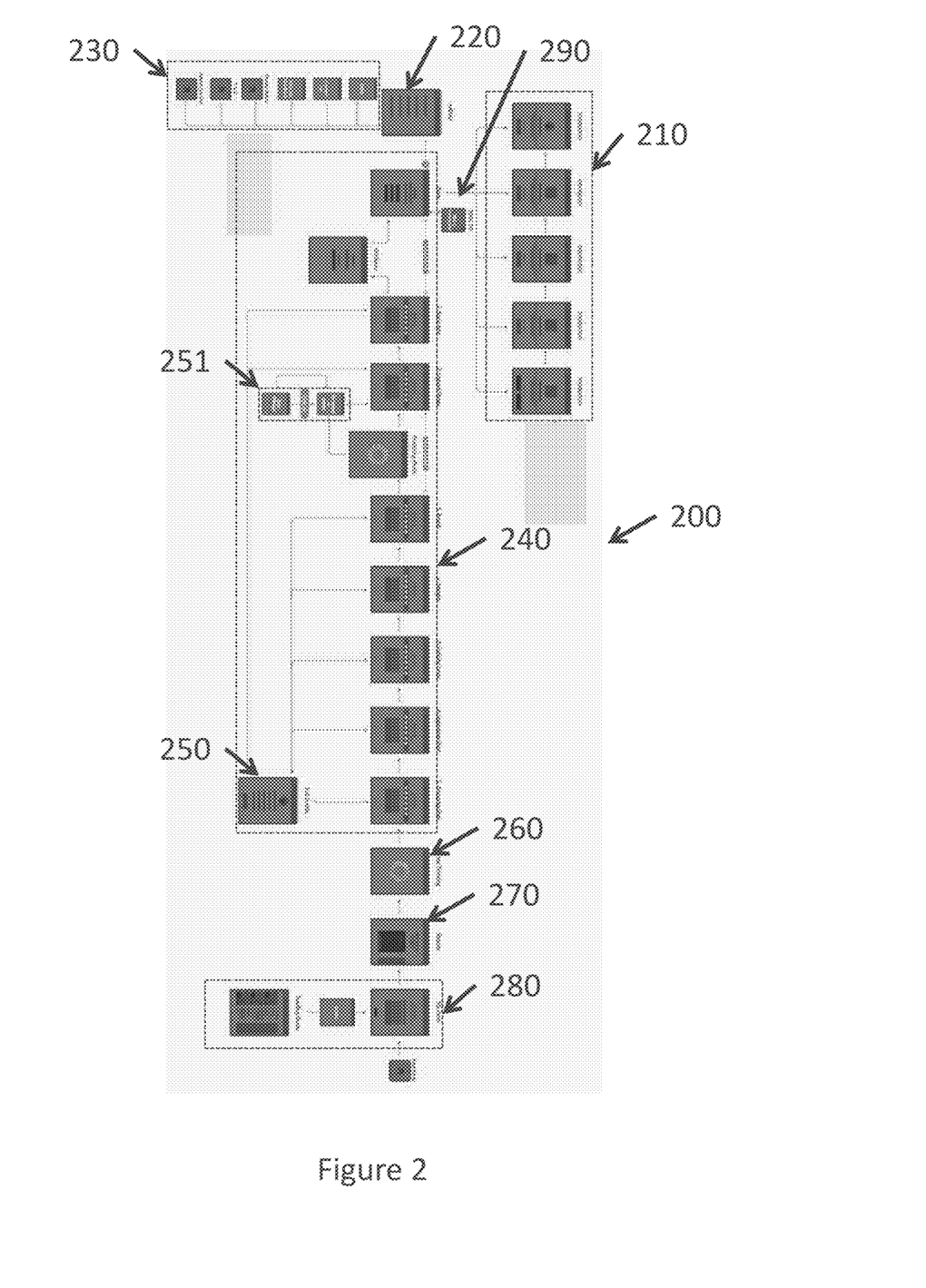
FIG. 2 illustrates an embodiment of an application diagram according to the present disclosure.

FIG. 2 generally illustrates an embodiment of an application diagram 200. The application diagram 200 may represent what the user 2 interacts with on the user device 11, shown in FIG. 1, to provide inputs to the interface 22, shown in FIG. 1.

Referring back to FIG. 2, an introduction 210 may be configured to receive background or baseline information from the user 2. For example, the introduction may receive login information, initial account preferences, required legal and/or data disclosure documents, and/or other general information from the user 1. The introduction 210 may only be used during an initial login to the interface 22, and may not be presented during subsequent logins after an initial user profile is created.

The interface 22 may provide a menu 220. The menu 220 may be the "home," "base," or initial interface presented to the user 2 when logged into the interface 22. The menu 220 may provide navigation elements to enable the user 2 to navigate to other locations within the interface 22.

The interface 22 may provide one or more menu options 230. The menu options 230 may be accessible from the menu 220. The menu options 230 may enable the user 2 to edit, set, and/or adjust settings in the interface 22 and/or access other information relating to the interface 22. For example, the menu options 230 may include screens and/or documents relating to frequently asked questions, contacts and/or contact information, feedback pages (e.g., user editable feedback, or already provided feedback by other users for the user 2 to review), a privacy policy, terms and conditions, and/or an explanation relating to ads on the interface 22.

The interface 22 may provide one or more profile inputs 240. The profile input 240 may be accessible from the menu 220. The profile input 240 may enable the user 2 to enter information relating to the pet and/or the preferences of the user 2 that may be used to determine the recommended pet food 21. For example, the profile input 240 may include: a start screen, which may give instructions for how the user 2 is to proceed; a basic information screen; a photo upload screen, where the user 2 may upload a pet image 3 for later use in the image recognition model 33, shown in FIG. 1; a breed information screen, where the user 2 can input information about the breed of the pet 1; a weight information screen, where the user 2 can input information about the weight of the pet 1; an activity level screen, where the user 2 can input information about the activity level of the pet 1; an ingredient preference screen, where the user 2 can input information about the ingredient preferences of the pet 1 and/or the user 2; a protein preference screen, where the user 2 can input information about the protein preferences of the pet 1 and/or the user 2; and/or a shopping preference screen, where the user 2 can input information about the shopping preferences of the user 2.

When at least one of the items in the profile input 240 is completed, a full profile 250 may be assembled using the information provided in the profile input 240 and/or any information generated by the pet image recognition model 33, the pet food recommendation model 63, and/or the historical database 101, as shown in FIG. 1. The full profile 250 may be used to generate the recommended pet food 21. For example, one or more characteristics included within the image recognition result 32 may be included within the full profile 250. The pet food recommendation model 63 may then analyze one or both of the image recognition result 32 and the full profile 250 to generate a pet food recommendation result 62, as described above.

In an embodiment, if the photo upload is available in the profile input 240, the profile input 240 may further include a file upload where the user can upload the pet image 3 and/or receive messages regarding the parameters of the photo if the photo does not meet certain predefined parameters. In certain implementations, the pet image 3 may require one or more photo characteristics. For example, in certain implementations, the image recognition model 33 may be configured to provide the most accurate results based on pet images 3 taken with the pet 1 facing toward the camera (e.g., the image recognition model 33 may be trained primarily on pet images 3 with the pet 1 facing the camera). In other examples, the image recognition model 33 may be configured to provide the most accurate results based on pet images 3 taken with the pet 1 in profile (e.g., the image recognition model 33 may be trained primarily on pet images 3 with the pet 1 in profile relative to the camera). The photo upload may specify the photo characteristics required or preferred for the image recognition model 33 to produce an accurate image recognition result 32. Additionally or alternatively, an analyzing photo visual may be provided to the user when the pet image recognition model 33 is processing the pet image 3 to determine the pet image recognition result 32.

The interface 22 may be provided with a thinking visual 260. The thinking visual 260 may be provided to the user when the pet image recognition model 33 is processing the pet image 3 and/or any other data inputs to determine the pet image recognition result 32, the pet food recommendation result 62, and/or the recommended pet food 21.

The interface 22 may be provided with results 270. The results 270 may be provided to the user 2 after the pet image recognition model 33 has processed the pet image 3 and/or any other data inputs to determine the pet image recognition result 32 and/or the pet food recommendation result 62. The results 270 may include the recommended pet food 21. The results 270 may include a link to access a feeding guide 280. As described above, in certain implementations the pet food recommendation result 62 may include a plurality of pet foods 62a-d from which the user may select the recommended pet food 21 from among the pet foods 62a-d. In such implementations, the results may include a food selection in which the user selects the recommended pet food.

The feeding guide 280 may include a feeding guide based on the recommended pet food 21, a pet food selected by the user, the pet image 3 and/or any other data inputs to determine the pet image recognition result 32 and/or the pet food recommendation result 62.

The interface 22 may be provided with tips 290. The tips 290 may be integrated into any of the other visuals discussed herein, and may provide the user 2 with recommendations or clarifications as the user 2 navigates through options included in the interface 22.

In some embodiments, the user may create a profile to store information about their pet, preferences, and buying history. This profile can be used to drive algorithmically powered programs that trigger future communication and interaction with the user. For example, the communication can be automated email or text message prompting the user to change the pet food or feeding recommendation when the pet reaches a defined life stage (e.g. adult). Machine learning capabilities can be applied to data captured on a device, for example, a connected device on the pet or user generated inputs in response to automated communication to continually enhance the quality and personalized nature of the pet food and feeding recommendations for the individual pet and/or pet owner.

Figure 3:
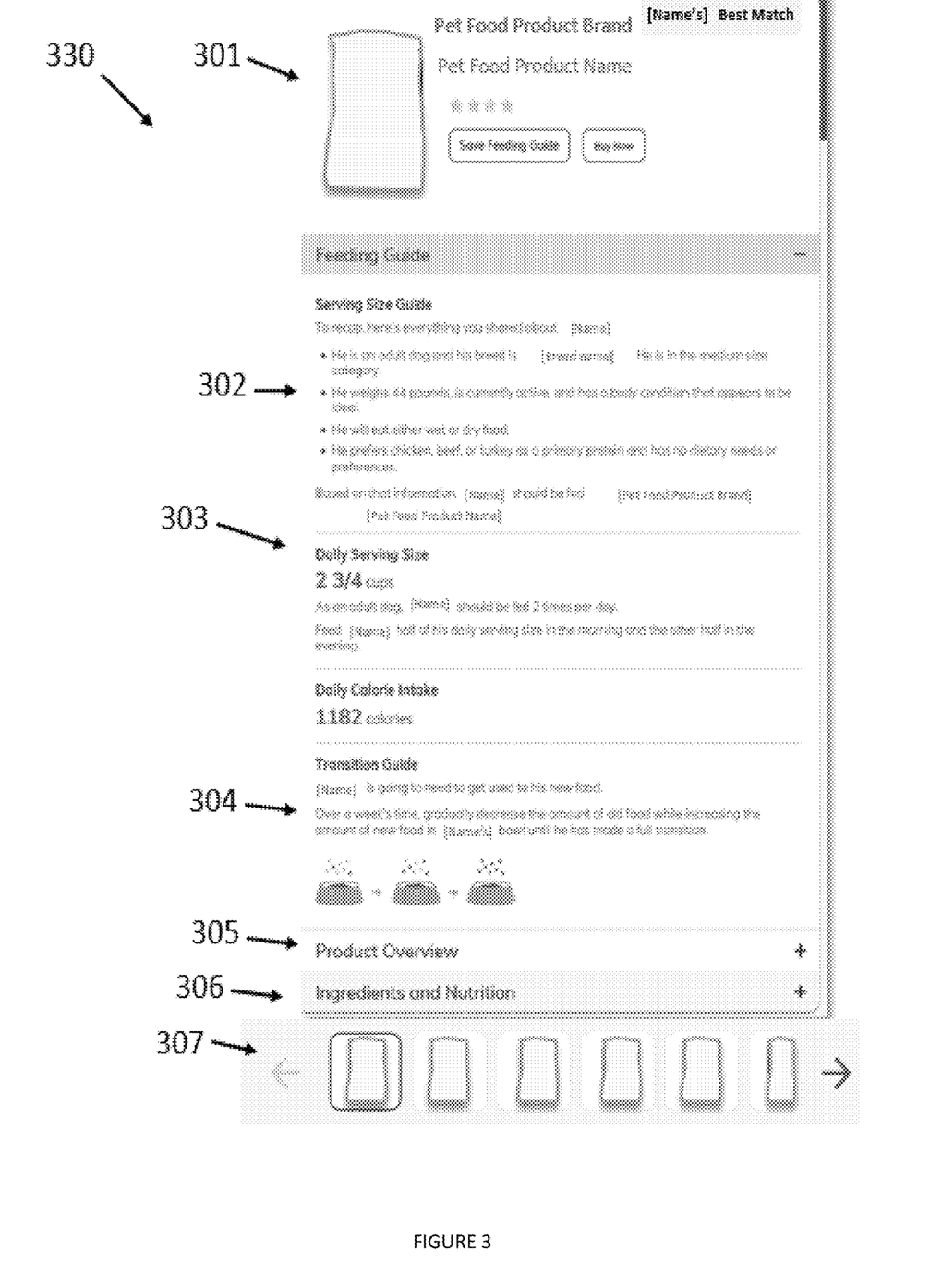
FIG. 3 illustrates an embodiment of a summary communication for providing personalized pet food recommendations and/or pet feeding recommendations according to the present disclosure.

FIG. 3 generally illustrates an embodiment of the customized feeding guide 330 for providing personalized pet food recommendations and/or pet feeding recommendations. As shown in FIG. 3, the customized feeding guide 330 is adapted for use on a web based and/or mobile application, although the customized feeding guide 330 may be provided on other media. The customized feeding guide 330 may include: a pet food selection 301; a pet profile 302; pet feeding instructions 303; pet food transition instructions 304; a product overview 305; product ingredient and nutrition information 306; and other pet food recommendations 307. The pet food selection may include pet's name, brand name, product name and an option to navigate to a website to purchase the pet food. The pet food selection 301 may also indicate the unit size, and/or style of pet food selected by the user 2. The pet profile 302 may reflect data inputs and generated information relating to the pet 1. For example, such information may include the pet breed, the pet weight, the pet activity level, the user and/or pet ingredient preference, pet protein preference, and/or the shopping preference. The pet feeding instructions 303 may include directions for feeding the pet 2. The pet feeding instructions 303 may consider the pet image 3 and/or any other data inputs to determine the pet image recognition result 32 and/or the pet food recommendation result 62, as well as the pet image recognition result 32 and/or the pet food recommendation result 62.

The pet food transition instructions 305 may include instructions for how to safely and successfully transition the pet 1 from a first food to a second food. The other pet food recommendations 307 may include other pet foods 62a, 62b, 62c, and 62d identified by the pet food recommendation model 63, but which the user 2 did not select.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims. Further, the present embodiments are thus not to be limited to the precise details of methodology or construction set forth above as such variations and modification are intended to be included within the scope of the present disclosure. Moreover, unless specifically stated any use of the terms first, second, etc. do not denote any order or importance, but rather the terms first, second, etc. are merely used to distinguish one element from another.

What is claimed is:

1. A method comprising:
   receiving, by a web interface server, a pet image depicting a pet;
   analyzing, by the web interface server using a pet image recognition model, the pet image to determine one or more pet characteristics of the pet, including:
      training the pet image recognition model to identify an image characteristic based on a percentage of pixels of the pet image occupied by the pet; and
      identifying the one or more pet characteristics of the pet using the trained pet image recognition model;
   receiving, by the web interface server, one or more pet-related data inputs;
   storing behavioral data of the pet in a historical database;
   training, by the web interface server, a pet food recommendation model based on the behavioral data stored in the historical database; and
   analyzing, by the web interface server using the pet food recommendation model, the pet characteristics and pet-related data inputs to generate a pet food recommendation and/or pet feeding recommendation for the pet.

2. The method of claim 1, wherein the pet image is received from a user device.

3. The method of claim 1, wherein analyzing the pet image further comprises:
   analyzing, by the web interface server, the pet image to identify one or more image characteristics of the pet image; and
   determining, by the web interface server, the one or more pet characteristics based on the image characteristics.

4. The method of claim 3, wherein the pet characteristics comprise one or more characteristics selected from the group consisting of a breed, a breed size, a pet size, a body condition, a life stage, an activity level, a pet gender, a pet gender status, and a weight of the pet.

5. The method of claim 1, further comprising:
   filtering, by the web interface server, a list of pet food products based on at least one user preference to create a filtered list of pet food products.

6. The method of claim 5, wherein the at least one user preference comprises at least one preference selected from the group consisting of a grain preference, protein preference, a food texture preference, a natural ingredient preference, and a shopping preference.

7. The method of claim 1, further comprising:
   calculating, by the web interface server, one or more variances selected from the group consisting of a breed size variance, a pet size variance, a body condition variance, a life stage variance, an activity level variance, and a pet weight variance.

8. The method of claim 1, further comprising:
   calculating, by the web interface server, a plurality of variances to generate a plurality of calculated variances; and
   scoring, by the web interface server, a list of pet food products based on a sum of the calculated variances to identify one or more recommended pet food products.

9. The method of claim 1, further comprising:
   presenting, by the web interface server, the pet food recommendation to a user, wherein the pet food recommendation contains a plurality of pet food products;
   receiving, by the web interface server, a selection from the user of a selected pet food product from the plurality of pet food products; and
   generating, by the web interface server, a pet feeding recommendation based on the selected pet food product.

10. The method of claim 9, wherein the pet feeding recommendation is generated based on a caloric density of the selected pet food product.

11. The method of claim 1, further comprising:
   training the pet image recognition model based on the behavioral data stored in the historical database.

12. A system comprising:
   a processor; and
   a memory storing instructions which, when executed by the processor, cause the processor to:
      receive a pet image depicting a pet;
      analyze, using a pet image recognition model, the pet image to determine one or more pet characteristics of the pet, including:
         training the pet image recognition model to identify an image characteristic based on a percentage of pixels of the pet image occupied by the pet; and
         identifying the one or more pet characteristics of the pet using the trained pet image recognition model;
      receive one or more pet-related data inputs;
      store behavioral data of the pet in a historical database;
      train a pet food recommendation model based on the behavioral data stored in the historical database;

analyze, using the pet food recommendation model, the pet characteristics and pet related data inputs to generate a pet food recommendation and/or pet feeding recommendation for the pet.

13. The system of claim 12, wherein the memory stores further instructions which, when executed by the processor, cause the processor to:
analyze the pet image to identify one or more image characteristics of the pet image; and
determine the one or more pet characteristics based on the image characteristics.

14. The system of claim 12, wherein the memory stores further instructions which, when executed by the processor, cause the processor to:
filter a list of pet food products based on at least one user preference to create a filtered list of pet food products.

15. The system of claim 14, wherein the pet characteristics comprise one or more characteristics selected from the group consisting of a breed, a breed size, a pet size, a body condition, a life stage, an activity level, a pet gender, a pet gender status, and a weight of the pet.

16. The system of claim 12, wherein the memory stores further instructions which, when executed by the processor, cause the processor to:
calculate one or more variances selected from the group consisting of a breed size variance, a pet size variance, a body condition variance, a life stage variance, an activity level variance, and a pet weight variance.

17. The system of claim 12, wherein the memory stores further instructions which, when executed by the processor, cause the processor to:
calculate a plurality of variances to generate a plurality of calculated variances; and
score a list of pet food products based on a sum of the calculated variances to identify one or more recommended pet food products.

18. The system of claim 12, wherein the memory stores further instructions which, when executed by the processor, cause the processor to:
present the pet food recommendation to a user, wherein the pet food recommendation contains a plurality of pet food products;
receive a selection from the user of a selected pet food product from the plurality of pet food products; and
generate a pet feeding recommendation based on the selected pet food product.

19. The system of claim 12, wherein the memory stores further instructions which, when executed by the processor, cause the processor to:
train the image recognition model based on the behavioral data stored in the historical database.

20. A non-transitory, computer-readable medium storing instructions which, when executed by a processor, cause the processor to:
receive a pet image depicting a pet;
analyze, using a pet image recognition model, the pet image to determine one or more pet characteristics of the pet, including:
training the pet image recognition model to identify an image characteristic based on a percentage of pixels of the pet image occupied by the pet; and
identifying the one or more pet characteristics of the pet using the trained pet image recognition model;
receive one or more pet-related data inputs;
store behavioral data of the pet in a historical database;
train a pet food recommendation model based on the behavioral data stored in the historical database; and
analyze, using the pet food recommendation model, the pet characteristics and pet-related data inputs to generate a pet food recommendation for the pet.

* * * * *